United States Patent
Zhang et al.

(10) Patent No.: US 11,882,463 B2
(45) Date of Patent: Jan. 23, 2024

(54) DEVICE PROVISIONING PROTOCOL WITH ENROLLEE FEEDBACK

(71) Applicant: Google LLC, Mountain View, CA (US)

(72) Inventors: Ning Zhang, Saratoga, CA (US); Yevgeniy Gutnik, Cupertino, CA (US)

(73) Assignee: Google LLC, Mountain View, CA (US)

( * ) Notice: Subject to any disclaimer, the term of this patent is extended or adjusted under 35 U.S.C. 154(b) by 441 days.

(21) Appl. No.: 17/280,048

(22) PCT Filed: Nov. 1, 2019

(86) PCT No.: PCT/US2019/059490
§ 371 (c)(1),
(2) Date: Mar. 25, 2021

(87) PCT Pub. No.: WO2020/092971
PCT Pub. Date: May 7, 2020

(65) Prior Publication Data
US 2021/0400502 A1   Dec. 23, 2021

Related U.S. Application Data (60) Provisional application No. 62/755,173, filed on Nov. 2, 2018.

(51) Int. Cl.
*H04W 24/02* (2009.01)
*H04W 76/18* (2018.01)
(Continued)

(52) U.S. Cl.
CPC ........... *H04W 24/02* (2013.01); *H04W 12/50* (2021.01); *H04W 76/14* (2018.02); *H04W 76/18* (2018.02); *H04W 88/10* (2013.01)

(58) Field of Classification Search
CPC ..... H04W 24/02; H04W 12/50; H04W 76/14; H04W 76/18; H04W 88/10; H04L 41/0806
See application file for complete search history.

(56) References Cited

U.S. PATENT DOCUMENTS

| 10,169,587 B1 * | 1/2019 | Nix .................... H04W 12/041 |
| 2018/0184296 A1 * | 6/2018 | Hunt ................... G06K 7/1417 |

(Continued)

FOREIGN PATENT DOCUMENTS

| CN | 107070863 | 8/2017 |
| WO | 2017173550 | 10/2017 |

(Continued)

OTHER PUBLICATIONS

"International Preliminary Report on Patentability", Application No. PCT/US2019/059490, dated Apr. 27, 2021, 9 pages.

(Continued)

*Primary Examiner* — Afshawn M Towfighi
(74) *Attorney, Agent, or Firm* — Colby Nipper PLLC (57) ABSTRACT

This document describes methods, devices, systems, and means for the provisioning of enrollee Wi-Fi devices to a Wi-Fi network. Many Wi-Fi devices have limited or no user interface capabilities, which presents challenges to connecting and, especially, securely connecting many of these devices to a Wi-Fi network. Techniques are described to enhance the Device Provisioning Protocol to solicit and provide feedback from an enrollee device to indicate band support of the enrollee device and provide the status of the enrollee device after attempting to join a provisioned Wi-Fi network.

20 Claims, 5 Drawing Sheets

(51) Int. Cl.
*H04W 76/14* (2018.01)
*H04W 12/50* (2021.01)
*H04W 88/10* (2009.01)

(56) References Cited

U.S. PATENT DOCUMENTS

| | | | |
|---|---|---|---|
| 2018/0227921 A1 | 8/2018 | Liu et al. | |
| 2018/0270049 A1 | 9/2018 | Cammarota et al. | |
| 2018/0316562 A1* | 11/2018 | Lepp | H04W 4/50 |
| 2019/0306702 A1* | 10/2019 | Yoon | H04W 12/06 |
| 2019/0356482 A1* | 11/2019 | Nix | H04W 12/041 |
| 2020/0413403 A1* | 12/2020 | Umehara | H04W 12/047 |
| 2021/0385778 A1* | 12/2021 | Ahn | H04W 60/00 |
| 2023/0224703 A1* | 7/2023 | Strater | H04W 52/42 |
| | | | 455/411 |

FOREIGN PATENT DOCUMENTS

| | | |
|---|---|---|
| WO | 2018047653 | 3/2018 |
| WO | 2020092971 | 5/2020 |

OTHER PUBLICATIONS

"Foreign Office Action", CN Application No. 201980058777.4, dated Jan. 18, 2023, 25 pages.
"International Search Report and Written Opinion", PCT Application No. PCT/US2019/059490, dated Mar. 18, 2020, 15 pages.
"Foreign Office Action", CN Application No. 201980058777.4, dated Jun. 27, 2023, 7 pages.

* cited by examiner

DEVICE PROVISIONING PROTOCOL WITH ENROLLEE FEEDBACK

RELATED APPLICATION(S)

This application is a national stage entry of International Application No. PCT/US2019/059490, filed Nov. 1, 2019, which claims the benefit of U.S. Provisional Application No. 62/755,173, filed Nov. 2, 2018, the disclosures of which are incorporated herein by reference in their entirety.

BACKGROUND

As the number and diversity of devices that use Wi-Fi connectivity increases, many devices have limited or no user interface capabilities. This presents challenges to connecting and, especially, securely connecting many of these devices to a Wi-Fi network. The Wi-Fi Alliance (WFA) has an Easy Connect™ program, based on a Device Provisioning Protocol (DPP), to address connecting devices to Wi-Fi networks using a configurator device, such as a smartphone or tablet, to assist in connecting the new device (e.g., an enrollee) to a Wi-Fi network.

SUMMARY

This summary is provided to introduce simplified concepts of a device provisioning protocol with enrollee feedback. The simplified concepts are further described below in the Detailed Description. This summary is not intended to identify essential features of the claimed subject matter nor is it intended for use in determining the scope of the claimed subject matter.

In an aspect, methods, devices, systems, and means for a device provisioning protocol with enrollee feedback are described in which an enrollee device transmits a Device Provisioning Protocol (DPP) Configuration Request frame including an indication of band support of the enrollee device to a configurator. In response to transmitting the DPP Configuration Request frame, the enrollee device receives a DPP Configuration Response frame that includes an indication of the Wi-Fi network that the enrollee device will attempt to join and a sendConnStatus attribute. Using the received indication of the Wi-Fi network to join, the enrollee device attempts to join the Wi-Fi network, and in response to the receiving the sendConnStatus attribute, the enrollee transmits a DPP Status Query Result frame to the configurator that includes a DPP Connection Status object indicating a result of the attempt to join the Wi-Fi network.

In another aspect, methods, devices, systems, and means for device provisioning protocol with enrollee feedback are described in which a configurator device receives a Device Provisioning Protocol (DPP) Configuration Request frame including an indication of band support of the enrollee. Based at least in part on the indication of the band support included in the received DPP Configuration Request frame, the configurator device determines to include an indication of the Wi-Fi network to which the enrollee is directed to join and a sendConnStatus attribute in a DPP Configuration Response frame. The configurator device transmits the DPP Configuration Response frame to the enrollee, the transmission of the DPP Configuration Response frame directing the enrollee to attempt to join the Wi-Fi network and the inclusion of the sendConnStatus attribute in the DPP Configuration Response frame directing the enrollee to transmit a DPP Status Query Result frame after attempting to join the Wi-Fi network. In response to transmitting the DPP Configuration Response frame, the configurator receives a DPP Status Query Result frame from the enrollee that includes a DPP Connection Status object indicating a result of the attempt by the enrollee to join the Wi-Fi network.

BRIEF DESCRIPTION OF THE DRAWINGS

The details of one or more aspects of a device provisioning protocol with enrollee feedback are described below. The use of the same reference numbers in different instances in the description and the figures indicate similar elements.

DETAILED DESCRIPTION

Overview

This document describes methods, devices, systems, and means for the provisioning of enrollee Wi-Fi devices to a Wi-Fi network. Many Wi-Fi devices have limited or no user interface capabilities which presents challenges to connecting and, especially, securely connecting many of these devices to a Wi-Fi network. Techniques are described to enhance the Device Provisioning Protocol to solicit and provide feedback from an enrollee device to indicate the frequency band support of the enrollee device and provide the status of the enrollee device after attempting to join a provisioned Wi-Fi network.

The Device Provisioning Protocol (DPP) defines techniques for using a configurator (e.g., smartphone, tablet computer, notebook computer, or the like) to configure a new Wi-Fi-capable device (e.g., an enrollee) to connect to a Wi-Fi network (e.g., a Wi-Fi access point (AP)). While the DPP improves the configuration process for users, conventional implementations of the DPP lack feedback mechanisms to mitigate issues that may arise during the configuration process.

In one aspect, the configurator and enrollee may or may not detect the same set of Wi-Fi networks. This may be due to the difference in the radio capabilities of the configurator and the enrollee. The enrollee device may only be capable of operation in the 2.4 GHz radio band while the configurator can operate in both the 2.4 GHz and 5 GHz radio bands. The configurator and enrollee devices may also have different Multiple Input Multiple Output (MIMO) capabilities and detection ranges (e.g., 1×1 versus 2×2). For example, in a home with two Wi-Fi networks provided by an access point, a 2.4 GHz Wi-Fi network ("AP2G") and a 5 GHz Wi-Fi network ("AP5G"), the configurator may detect both Wi-Fi networks while the enrollee may only detect AP2G or only detect AP5G. The DPP release 1.0 lacks a mechanism for the enrollee to notify the configurator which frequency bands are supported by the enrollee. Providing feedback to the configurator to indicate the band support of the enrollee can prevent provisioning failures and provide the user with a more reliable provisioning experience.

In another aspect, the DPP release 1.0 lacks a mechanism for the enrollee, after a successful provisioning, to notify the configurator if the enrollee can successfully connect to the provisioned Wi-Fi network. For example, if the enrollee fails to connect (e.g., due to a wrong passphrase, an AP rejection, the enrollee's inability to locate the AP, or another reason), the configurator is unaware of the connection status of the enrollee. Providing feedback to the configurator to indicate the connection status of the enrollee provides the user with a more reliable provisioning experience and confidence that the provisioning was successful.

Example Environment

Figure 1:
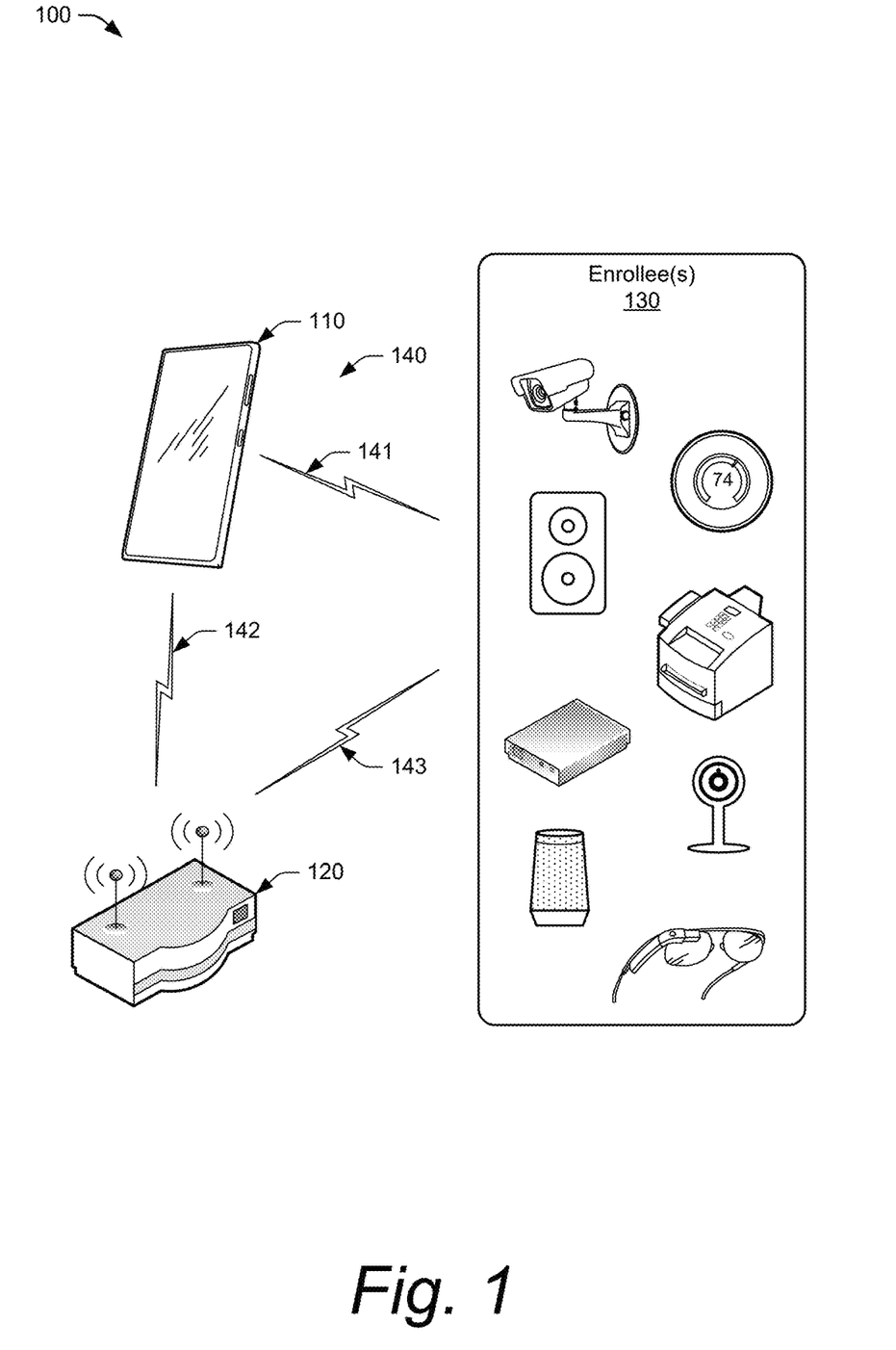
FIG. 1 illustrates an example operating environment in which aspects of a device provisioning protocol with enrollee feedback can be implemented.

FIG. 1 illustrates an example environment 100, which includes a configurator 110, a Wi-Fi access point 120, and enrollee(s) 130. Each of these devices may be wireless-network-enabled and capable of communicating data, packets, and/or frames over a wireless link 140 (illustrated as wireless links 141, 142, and 143). The wireless links 140 may include any suitable type of wireless communication link or wireless network connection. For example, the wireless links 140 may be implemented in whole or in part as a wireless local-area-network (WLAN), ad-hoc WLAN (e.g., a direct wireless link), wireless mesh network, near-field communication (NFC) link, wireless personal-area-network (WPAN), wireless wide-area-network (WWAN), or short-range wireless network. The wireless link 140 may be implemented in accordance with any suitable communication protocol or Institute of Electrical and Electronics Engineers (IEEE) standard, such as IEEE 802.11-2012, IEEE 802.11-2016, IEEE 802.11ac, IEEE 802.11ad, IEEE 802.11ah, IEEE 802.11ax, and the like.

In this example, the access point 120 is implemented to provide and manage a wireless network that includes the wireless links 140. The wireless links 140 may be implemented with any suitable modulation and coding scheme (MCS), such as orthogonal frequency division multiplexing access (OFDMA). In other cases, the access point 120 may include or be embodied as a host device, enhanced node base station, wireless router, broadband router, modem device, drone controller, vehicle-based network device, or other network administration node or device. The configurator 110 and the enrollee(s) 130 of the example environment 100 operate as stations in the wireless network provided by the access point 120. The enrollee device 130 may include a smart-phone, set-top box, tablet computer, a wireless speaker, a wireless smart-speaker, a camera, a wearable device, a wireless printer, a mobile station, a laptop computer, a medical device, a security system, a drone, an Internet-of-Things (IoT) device, a gaming device, a smart appliance, an Internet-protocol enabled television (IP TV), a personal media device, a navigation device, a mobile-internet device (MID), a network-attached-storage (NAS) drive, a mobile gaming console, and so on.

Generally, the access point 120 provides connectivity to the Internet, other networks, or network-resources through a backhaul link (not shown), which may be either wired or wireless (e.g., a T1 line, fiber optic link, broadband cable network, intranet, a wireless-wide-area network). The backhaul link may include or connect with data networks operated by an internet service provider, such as a digital subscriber line or broadband cable provider and may interface with the access point 120 via an appropriately configured modem (not shown). While associated with the wireless network provided by the access point 120 (e.g., via the wireless links 140), the configurator and/or the enrollee(s) may access the Internet, exchange data with each other, or access other networks for which access point 120 acts as a gateway.

Example Devices

Figure 2:
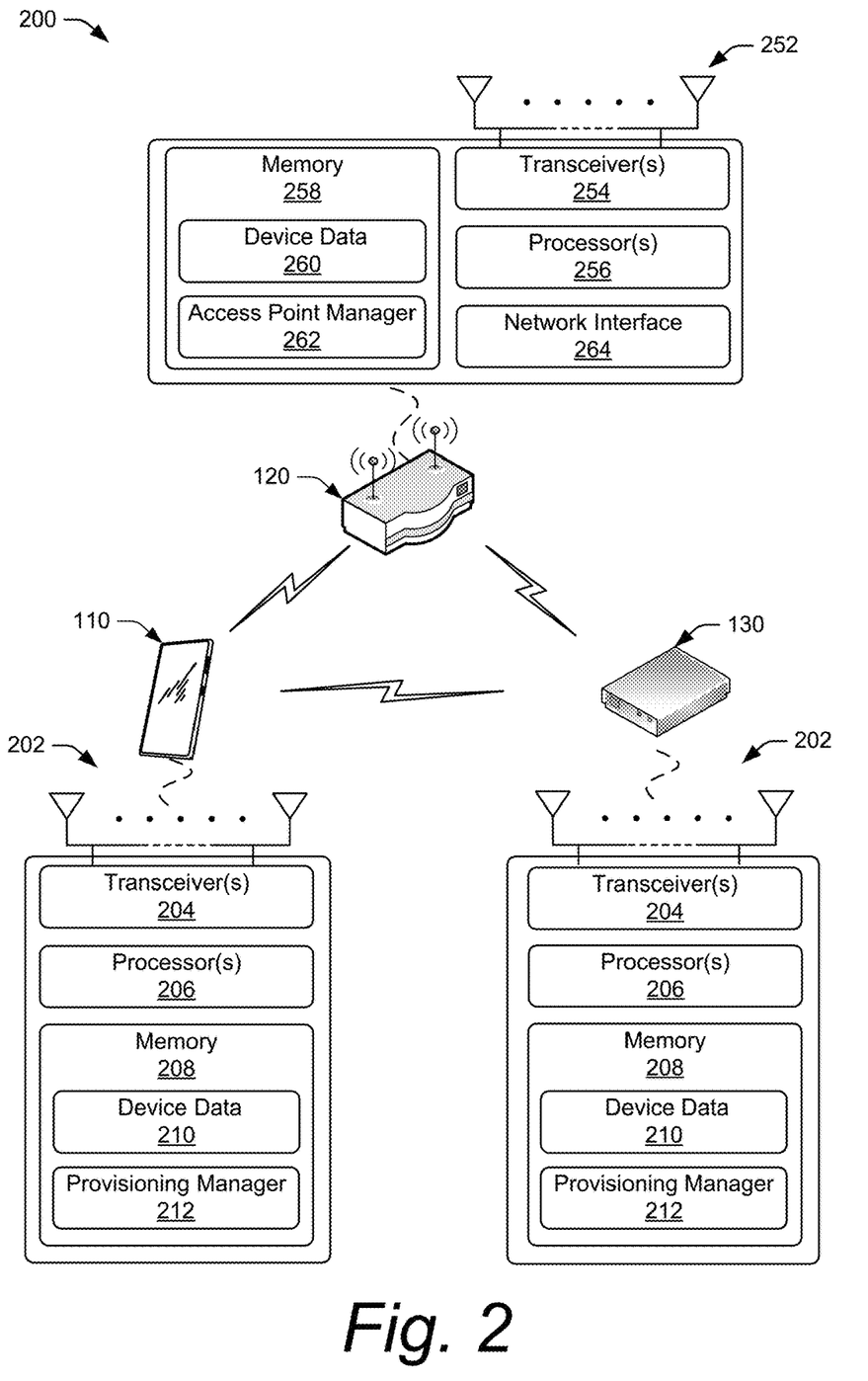
FIG. 2 illustrates an example device diagram of a configurator, an enrollee, and an access point.

FIG. 2 illustrates an example device diagram 200 of a configurator, an access point, and an enrollee. In aspects, the device diagram 200 describes devices that can implement various aspects of a device provisioning protocol with enrollee feedback. The configurator 110 and the enrollee(s) 130 each operate as a station (STA) in the wireless network provided by the access point 120. As stations, the configurator 110 and the enrollee(s) 130 each include one or more antennas 202 and one or more transceivers 204 for communicating with the access point 120 or other wirelessly-enabled devices. The transceivers 204 may include any suitable number of respective communication paths (e.g., transmit or receive chains) to support transmission or reception of multiple spatial streams of data. Front-end circuitry (not shown) of the configurator 110 and the enrollee(s) 130 may couple or connect the transceiver 204 to the antennas 202 to facilitate various types of wireless communication. The antennas 202 may include an array of multiple antennas that are configured similar to or differently from each other.

The configurator 110 and the enrollee(s) 130 also include processor(s) 206 and memory 208 (computer-readable storage media 208, CRM 208). The processor(s) 206 may be a single core processor or a multiple core processor composed of a variety of materials, such as silicon, polysilicon, high-K dielectric, copper, and so on. The computer-readable storage media described herein excludes propagating signals. CRM 208 may include any suitable memory or storage device such as random-access memory (RAM), static RAM (SRAM), dynamic RAM (DRAM), non-volatile RAM (NVRAM), read-only memory (ROM), or Flash memory useable to store device data 210 of the configurator 110 or the enrollee 130. The device data 210 includes user data, multimedia data, applications, and/or an operating system of the configurator 110 or the enrollee 130 that are executable by processor(s) 206 to enable wireless communication and user interaction with the configurator 110 or the enrollee 130. In the context of the disclosure, the CRM 208 is implemented as storage media, and thus does not include transitory signals or carrier waves.

CRM 208 also includes a provisioning manager 212 (e.g., provisioning manager application 212). Alternately or additionally, the provisioning manager 212 may be implemented in whole or part as hardware logic or circuitry integrated with or separate from other components of the configurator 110 and the enrollee(s) 130. In at least some aspects, the provisioning manager 212 configures the transceiver(s) 204 to implement the techniques described herein for a device provisioning protocol with enrollee feedback.

The access point 120 includes one or more antennas 252 and one or more transceivers 254 for communicating with the configurator 110, the enrollee(s) 130, or other wirelessly-enabled devices. The transceivers 254 may include any suitable number of respective communication paths (e.g., transmit or receive chains) to support transmission or reception of multiple spatial streams of data. Front-end circuitry (not shown) of the access point 120 may couple or connect the transceiver 254 to the antennas 252 to facilitate various types of wireless communication. The antennas 252 may include an array of multiple antennas that are configured similar to or differently from each other.

The access point 120 also includes processor(s) 256 and memory 258 (computer-readable storage media 258, CRM 258). The processor(s) 256 may be a single core processor or a multiple core processor composed of a variety of materials, such as silicon, polysilicon, high-K dielectric, copper, and so on. The computer-readable storage media described herein excludes propagating signals. CRM 258 may include any suitable memory or storage device such as random-access memory (RAM), static RAM (SRAM), dynamic RAM (DRAM), non-volatile RAM (NVRAM), read-only memory (ROM), or Flash memory useable to store device data 260 of the access point 120. The device data 260 includes applications, and/or an operating system of the access point 120 that are executable by processor(s) 256 to enable wireless communication with the configurator 110 or the enrollee(s) 130. In the context of the disclosure, the CRM 258 is implemented as storage media, and thus does not include transitory signals or carrier waves.

130 to determine candidate Wi-Fi networks for provisioning the enrollee device 130. The configurator 110 chooses one of the candidate networks as the network for provisioning the enrollee 130. For example, after the bootstrapping and authentication portions of the DPP, the configurator 110 queries the enrollee 130 for its band support before performing the configuration portion of the DPP for the enrollee device 130.

In another aspect, after the bootstrapping and authentication portions of the DPP, the enrollee 130 sends a configuration request frame (e.g., a Device Provisioning Protocol (DPP) Configuration Request frame) to the configurator 110 during the configuration step of the DPP. The configuration request frame includes an additional parameter to indicate the band support of the enrollee 130. For example, the enrollee 130 may support a 2.4 GHz band, a 5 GHz band, a 6 GHz band, or any combination thereof. In one aspect, a parameter (e.g., a bandSupport parameter) to indicate the band support of the enrollee 130 is included in a DPP Configuration Request object that is included in the DPP Configuration Request frame:

| Parameter Name | Type | Value | Description |
| --- | --- | --- | --- |
| configRequest | OBJECT | | Object Name |
| name | STRING | | Device Name |
| wi-fi_tech | STRING | infra | The type of network that the Enrollee wishes to be enrolled in. The wi-fi_tech value indicates which DPP Configuration Request object parameters are present beyond the mandatory name and wi-fi_tech and what values those parameters use. This specification covers defines the wi-fi_tech=infra case. Other specifications may define use of other wi-fi_tech values. Any such value needs to be assigned by Wi-Fi Alliance for a specific document. |
| netRole | STRING | sta, ap, configurator | The role that the Enrollee wishes to obtain. These values are used with the wi-fi_tech=infra case. |
| mudurl | STRING | | A Universal Resource Locator for a Manufacturer Usage Description per [RFC 8520]. This value is optionally included when the Enrollee has been manufactured with a MUD URL. |
| bandSupport | STRING | 2.4 GHz, 5 GHz, 6 GHz | The frequency bands supported by the Enrollee. |

CRM 258 also includes an access point manager 262 (access point manager application 262). Alternately or additionally, the access point manager 262 may be implemented in whole or part as hardware logic or circuitry integrated with or separate from other components of the access point 120. In at least some aspects, the access point manager 262 configures the transceiver(s) 254 to implement the techniques described herein for a device provisioning protocol with enrollee feedback. The access point manager 262 also configures a network interface 264 to relay communications between the configurator 110, the access point 120, the enrollee(s) 130, and an external network.

Device Provisioning Protocol Configuration Request

In an aspect, a mechanism for the enrollee 130 to notify the configurator 110 of the band support of the enrollee 130 is added to the Device Provisioning Protocol (DPP). After connecting on a DPP Wi-Fi channel, the enrollee 130 sends the band support of the enrollee 130 to the configurator 110. The configurator 110 uses the band support of the enrollee Enrollee Connection Status Reporting In another aspect, a mechanism for the enrollee 130 to notify the configurator 110 of the status of the enrollee's attempt to connect to the provisioned Wi-Fi network is added to the DPP. To receive the status of the provisioning, the configurator 110 includes a sendConnStatus attribute in a DPP Configuration Response frame and transmits the DPP Configuration Response frame to the enrollee 130. In response to receiving the DPP Configuration Response frame, the enrollee 130 responds by transmitting a DPP Configuration Confirm frame to the configurator 110. After successfully receiving the DPP Configuration Confirm frame from the enrollee 130, the configurator 110 remains on the DPP Wi-Fi channel, listening to receive a DPP Status Query Result frame from the enrollee 130. The configurator 110, either receives the DPP Status Query Result frame or terminates listening for the DPP Status Query Result frame after a timeout period of time. If the enrollee 130 successfully joins the provisioned Wi-Fi network, the enrollee 130 returns to the DPP Wi-Fi channel and transmits the DPP Status Query Result frame indicating the status for the connection attempt.

The DPP Status Query Result frame includes a DPP Connection Status object and a channel object that include:

| Parameter Name | Type | Value | Description |
| --- | --- | --- | --- |
| connStatus | OBJECT | | Object Name |
| result | INTEGER | STATUS_OK, STATUS_AUTH_FAILURE STATUS_INVALID CONNECTOR, STATUS_CONNECTOR_EXPIRED STATUS_NO_MATCH, STATUS_NO_AP | The result object indicates the DPP Status value indicating the result of a connection attempt after the configuration has been applied. |
| ssid | STRING | | A string indicating the SSID for the AP that the Enrollee attempted to connect. |
| channelList | ARRAY | | A list of operating channel objects indicating the channels that the Enrollee scanned in attempting to discover the AP. |
| channel | OBJECT | | Object Name |
| channelNumber | INTEGER | Channel number | A channel number corresponding to the operating class. |
| operatingClass | INTEGER | Operating class | An operating class corresponding to the channel number. |

When the enrollee 130 sends the connection status information to the configurator 110, the configurator 110 and the enrollee 130 may or may not be on the same network. Mechanisms to send the connection status need to account for the configurator 110 and the enrollee 130 being on the same or different networks.

In one aspect, the configurator 110 explicitly queries for the connection status through the Internet (or the same network if the configurator 110 and the enrollee 130 are on the same network). If the configurator 110 does not receive a response from the enrollee 130 after a timeout period, the configurator 110 moves to the DPP channel (the Wi-Fi channel used for the DPP provisioning) and explicitly queries for the enrollee's connection status (e.g., a failed connection). Concurrently, if the enrollee 130 can't connect to the provisioned network, the enrollee 130 moves back to the DPP channel and waits for the configurator's query. When queried, the enrollee 130 returns a status (e.g., a failure code) to the configurator 110.

In another aspect, after provisioning is complete, the configurator 110 waits on the DPP channel for a status report from the enrollee 130 for a timeout period of time. The enrollee 130 moves to the DPP channel and sends the status report to the configurator 110, either after a successful connection, after a failed connection attempt, or a fixed timeout (e.g., 15 seconds). For example, the configurator 110 indicates the amount of time (e.g., 15 seconds) that the configurator 110 will wait on the DPP channel for the status report from the enrollee 130 until the timeout expires.

In another example, the configurator 110 indicates a schedule (e.g., the first 100 milliseconds of every one second for 10 seconds) that the configurator 110 will wait on the DPP channel and listen for the status report from the enrollee 130 before the timeout expires. The enrollee 130 will send the latest network connection status (as defined above) according to the schedule indicated by the configurator 110.

Optionally or additionally, when the configurator 110 receives a status of 1xxx (failure cases) or 0011 (successful Internet connection), the configurator 110 and the enrollee 130 will terminate the out-of-band communication schedule on the DPP channel. Additionally or optionally, when the configurator 110 receives a status of 0001 and a connected AP channel number, the configurator 110 can choose to move to the AP channel and send a direct status query to the enrollee 130 on the AP channel (e.g., through sending a DPP Configuration Response frame with a status report type field set to a value to indicate "request immediate status report") and terminate the out-of-band communication schedule on the DPP channel.

In additional aspects, an optional attribute is included in the configuration response frame. The configurator 110 uses the optional attribute to send an explicit request for the enrollee device 130 to send a status report through a configuration results frame after the configuration request during the configuration portion of the DPP. The status report is sent through a configuration results frame after the enrollee device 130 connection attempt and indicates the amount of time for a timeout. This provides options for different use cases to indicate if the status report is needed. For example, if the configurator 110 is an AP, the configurator will know if the connection is successful or not without the status report. In this use case, the configurator 110 doesn't request a status report to avoid unnecessary operations. The absence of the optional attribute indicates that no status report is requested.

In one alternative, the optional attribute included in the configuration response frame has the following fields:

00: request immediate status report (i.e., requesting the enrollee 130 to report current status) on the same channel on which the configuration response is sent.
01: request delayed status report whenever the status is changed (i.e., requesting the enrollee 130 to report status when there is a change in status) up to the AP connection with a schedule
10: request delayed status report whenever the status is changed (i.e., requesting the enrollee 130 to report status when there is a change in status) up to IP assignment with a schedule
11: request delayed status report whenever the status is changed (i.e., requesting enrollee 130 to report status when there is a change in status) up to Internet connection with a schedule The schedule is fixed as starting at the end of the configuration response frame with the window for the enrollee to transmit the configuration results frame being the first 100 milliseconds of every one second until specified time-out.

The time-out choices are:
00: One second (indicating that the configurator 110 will only wait for 100 milliseconds on the DPP configuration channel during the one second)
01: 10 seconds (indicating that the configurator 110 will wait for 100 milliseconds on the DPP configuration channel, either remain on the DPP channel or switch to a different channel for 900 milliseconds, wait for 100 milliseconds on the DPP configuration channel, either remain on the DPP channel or switch to a different channel for 900 milliseconds, and repeat a total of 10 times)
10: 30 seconds
11: 60 seconds In another alternative, the optional attribute included in the configuration response frame has the following fields:
000: request immediate status report (e.g., requesting the enrollee 130 to report current status) on the same channel on which the configuration response is sent.
001: request delayed status report with a schedule up to 1 second
010: request delayed status report with a schedule up to 10 seconds
011: request delayed status report with a schedule up to 30 seconds
100: request delayed status report with a schedule up to 60 seconds
101-111: reserved Starting at the end of configuration response frame, the scheduled window for the enrollee 130 to transmit the configuration results frame is the first 100 milliseconds of every one second until the specified time-out. The enrollee 130 transmits the configuration results frame close to the middle of the window or immediately after the status change, if the status change happens within a window.

When the configurator 110 only requests the configuration status, the configurator 110 uses the immediate status report. A configuration response frame with immediate status report will terminate any remaining schedule of a delayed status report.

Figure 3:
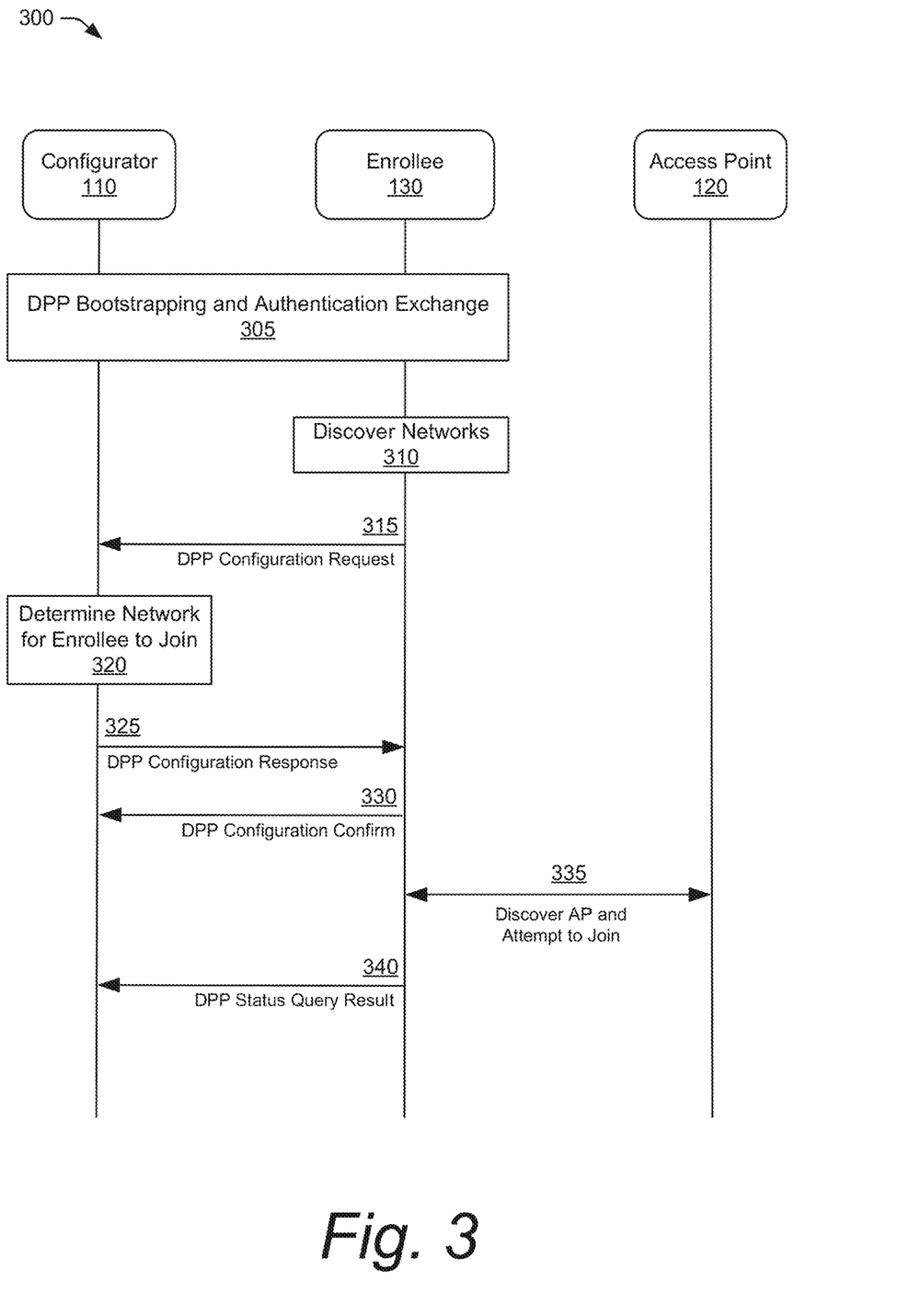
FIG. 3 illustrates example data and control transactions between devices in accordance with aspects of a device provisioning protocol with enrollee feedback.

FIG. 3 illustrates data and control transactions between a configurator, an access point, and an enrollee in accordance with aspects of a device provisioning protocol with enrollee feedback. At 305, the enrollee 130 and the configurator 110 bootstrap the Device Provisioning Protocol (DPP) including key exchanges and authentication procedures to initiate the DPP. The DPP bootstrapping and authentication exchange may occur on a DPP Wi-Fi channel.

At 310, the enrollee 130 transmits a DPP Configuration Request frame to the configurator 110. The enrollee 130 includes an indication of the band support of the enrollee 130.

At 315, the configurator 110 uses the band support of the enrollee 130 to determine which network that the enrollee 130 is to join. For example, the configurator 110 displays the candidate networks on a user interface display of the configurator 110. The configurator 110 then receives a selection from a user of the network that the enrollee 130 will attempt to join, via a user interface control of the configurator 110.

At 320, the configurator 110 transmits a DPP Configuration Response frame to the enrollee 130. The configurator 110 includes an indication of the Wi-Fi network that the enrollee will attempt to join. Optionally, the configurator 110 can include a sendConnStatus attribute in the DPP Configuration Response frame. The sendConnStatus attribute directs the enrollee 130 to report a status of the attempt to join the indicated Wi-Fi network to the configurator 110.

At 325, the enrollee 130 transmits a DPP Configuration Confirm message to the configurator 110. In response to receiving the DPP Configuration Confirm message, the configurator remains on the DPP Wi-Fi channel to wait for a DPP Status Query Result frame from the enrollee 130.

At 330, the enrollee 130 attempts to discover and join the selected Wi-Fi network. At 335, the enrollee 130 transmits a DPP Status Query Result frame to the configurator 110 that includes the connectionStatus object indicating the result of the attempt to join the selected Wi-Fi network.

Example Methods

Example methods 400 and 500 are described with reference to FIGS. 4 and 5 in accordance with one or more aspects of a device provisioning protocol with enrollee feedback. The order in which the method blocks are described are not intended to be construed as a limitation, and any number of the described method blocks can be skipped, repeated, or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
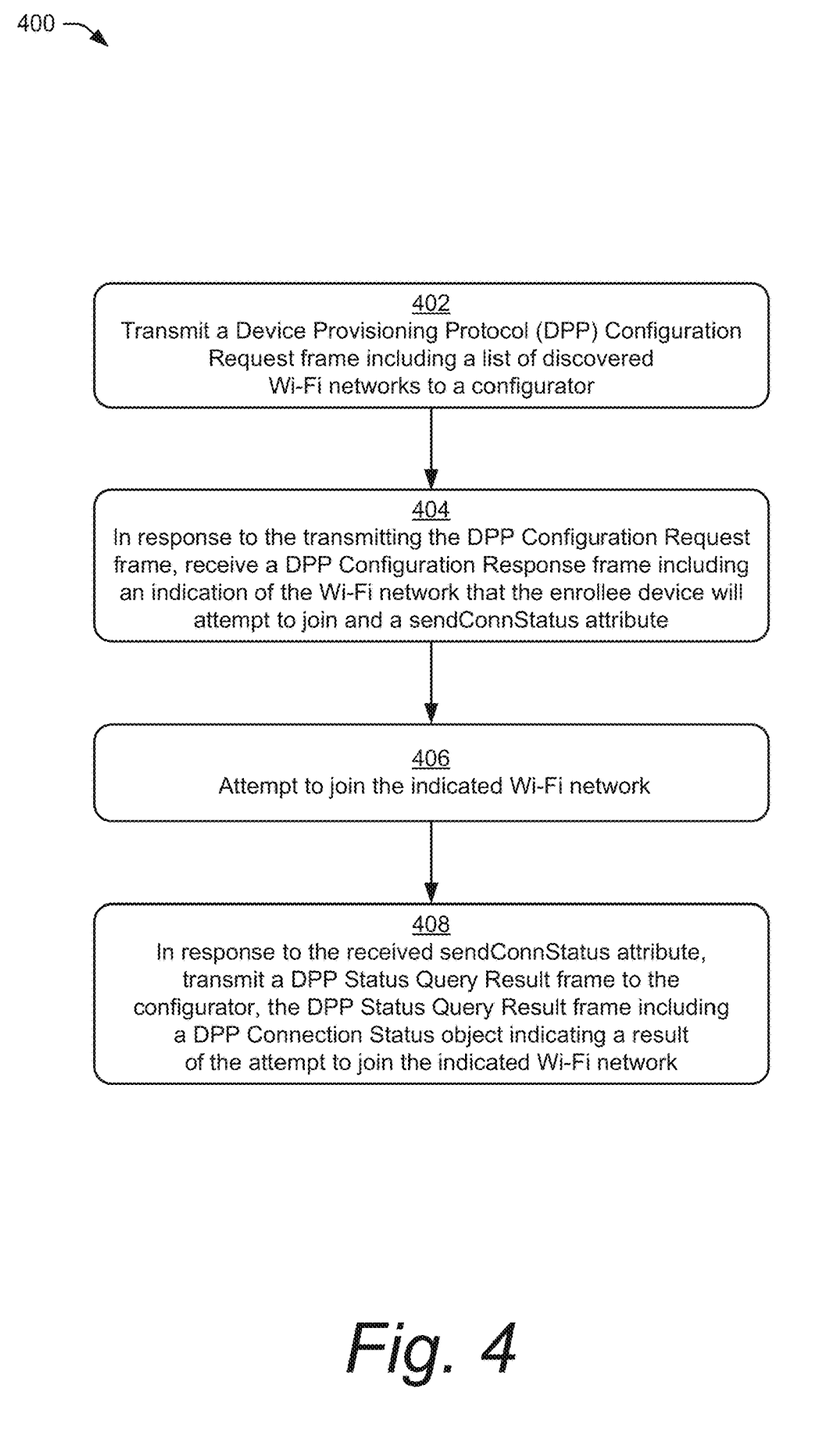
FIG. 4 illustrates an example method of a device provisioning protocol with enrollee feedback as generally related to an enrollee in accordance with aspects of the techniques described herein.

FIG. 4 illustrates example method(s) 400 of a device provisioning protocol with enrollee feedback as generally related to an enrollee device. At 402, an enrollee device transmits a Device Provisioning Protocol (DPP) Configuration Request frame including an indication of the frequency bands supported by the enrollee. For example, an enrollee device (e.g., the enrollee 130) transmits a Device Provisioning Protocol (DPP) Configuration Request frame including an indication of the band support of the enrollee to a configurator (e.g., the configurator 110). The enrollee 130 includes a parameter to indicate the band support of the enrollee 130 in a DPP Configuration Request object that is included in the DPP Configuration Request frame.

At 404, in response to the transmitting the DPP Configuration Request frame, the enrollee device receives a DPP Configuration Response frame including an indication of the Wi-Fi network that the enrollee device will attempt to join and a sendConnStatus attribute. For example, in response to the transmitting the DPP Configuration Request frame, the enrollee 130 receives a DPP Configuration Response frame including an indication of the Wi-Fi network that the enrollee 130 will attempt to join and a sendConnStatus attribute. The sendConnStatus attribute directs the enrollee 130 to transmit a DPP Status Query Result frame to the configurator 110 after attempting to join the indicated Wi-Fi network. In response to successfully receiving DPP Configuration Response frame, the enrollee 130 transmits a DPP Configuration Confirm frame to the configurator 110.

At 406, the enrollee device attempts to join the indicated Wi-Fi network. For example, the enrollee 130 attempts to join the Wi-Fi network indicated in the DPP Configuration Response frame.

At 408, in response to the received sendConnStatus attribute, the enrollee device transmits a DPP Status Query Result frame to the configurator, the DPP Status Query Result frame including a DPP Connection Status object indicating a result of the attempt to join the indicated Wi-Fi network. For example, in response to the configurator 110 including the sendConnStatus attribute in the DPP Configuration Response frame, the enrollee 130 transmits a DPP Status Query Result frame to the configurator 110. The enrollee 130 includes a DPP Connection Status object indicating a result of the attempt to join the indicated Wi-Fi network in the DPP Status Query Result frame.

Figure 5:
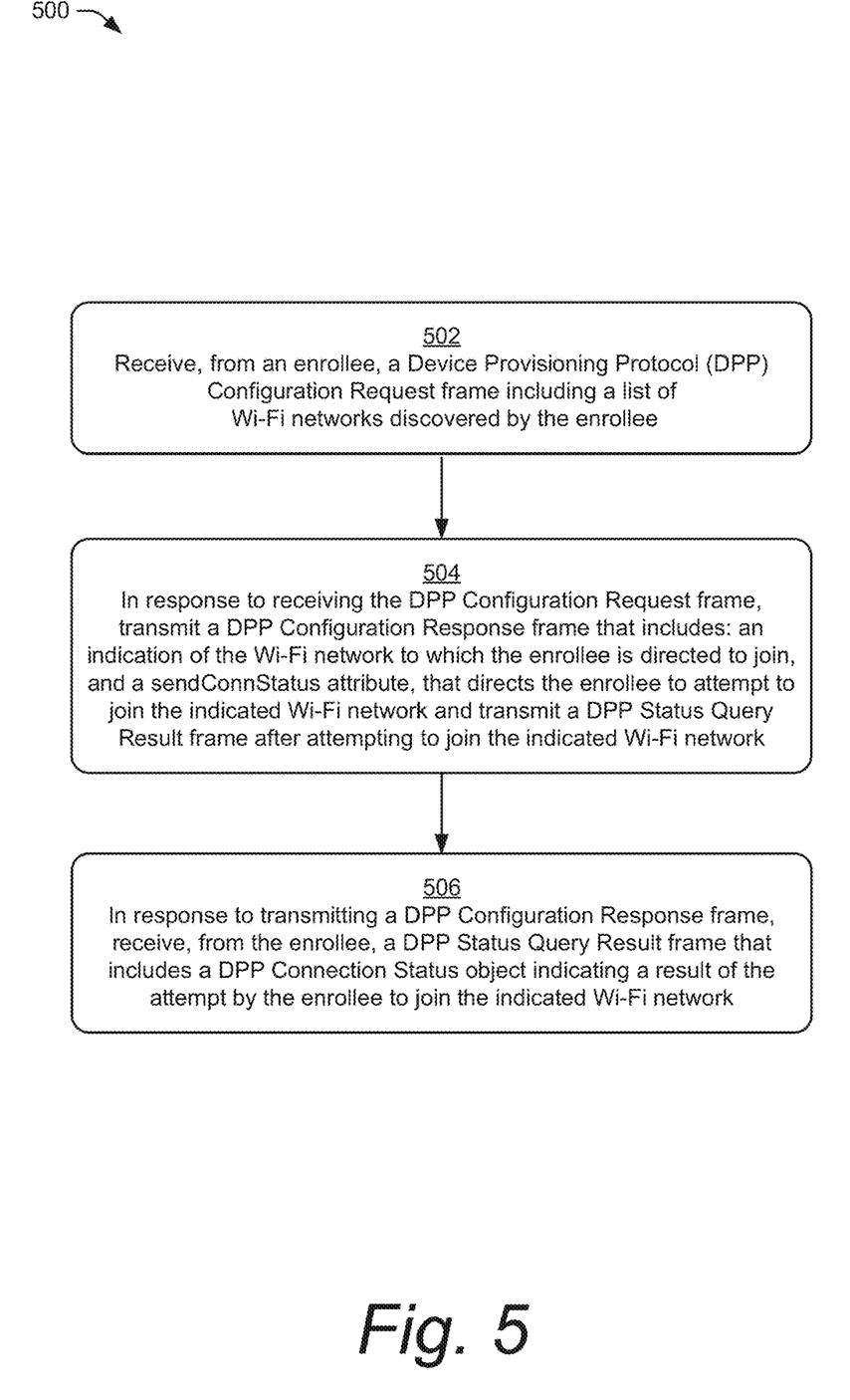
FIG. 5 illustrates an example method of a device provisioning protocol with enrollee feedback as generally related to a configurator in accordance with aspects of the techniques described herein.

FIG. 5 illustrates example method(s) 500 of a device provisioning protocol with enrollee feedback as generally related to a configurator device. At 502, a configurator device receives, from an enrollee, a Device Provisioning Protocol (DPP) Configuration Request frame including an indication of band support of the enrollee. For example, a configurator device (e.g., the configurator 110) receives, from an enrollee (e.g., the enrollee 130), a Device Provisioning Protocol (DPP) Configuration Request frame including a parameter to indicate the band support of the enrollee 130 in a DPP Configuration Request object that is included in the DPP Configuration Request frame.

At 504, based at least in part on the indication of the band support included in the received DPP Configuration Request frame, the configurator device determines to include an indication of the Wi-Fi network to which the enrollee is directed to join and a sendConnStatus attribute in a DPP Configuration Response frame. For example, based at least in part on the indication of the band support included in the received DPP Configuration Request frame, the configurator 110 determines that the enrollee supports a frequency band for the Wi-Fi network and includes an indication of the Wi-Fi network to which the enrollee is directed to join and a sendConnStatus attribute in a DPP Configuration Response frame. The configurator 110 may present candidate Wi-Fi networks and associated information in a user interface of the configurator 110 and receive an input from a user of the configurator 110 to select the Wi-Fi network that is indicated in the DPP Configuration Response frame.

At 506, the configurator transmits the DPP Configuration Response frame to the enrollee, to direct the enrollee to attempt to join the Wi-Fi network and the inclusion of the sendConnStatus attribute in the DPP Configuration Response frame directing the enrollee to transmit a DPP Status Query Result frame after attempting to join the Wi-Fi network.

At 508, in response to the transmitting a DPP Configuration Response frame, the configurator device receives, from the enrollee, a DPP Status Query Result frame that includes a DPP Connection Status object indicating a result of the attempt by the enrollee to join the indicated Wi-Fi network. For example, in response to the transmitting a DPP Configuration Response frame, the configurator 110 receives, from the enrollee 130, a DPP Status Query Result frame that includes a DPP Connection Status object indicating a result of the attempt by the enrollee 130 to join the indicated Wi-Fi network. The DPP Connection Status object may indicate that: the enrollee 130 successfully associated to an AP and has network access; the enrollee 130 discovered the AP, and association or authentication failed with the AP failed; an enrollee connection failed with an invalid connector during network introduction; the enrollee connection failed to connect to an AP that has an expired connector; the enrollee connection failed to match an AP connector; or the enrollee 130 failed to discover an access point.

In the following some examples are described:

Example 1: A method for provisioning an enrollee device to a Wi-Fi network by a configurator, the method comprising the enrollee device:
  transmitting a Device Provisioning Protocol (DPP) Configuration Request frame to the configurator, the DPP Configuration Request frame including an indication of band support of the enrollee device;
  receiving a DPP Configuration Response frame including:
    an indication of a Wi-Fi network that the enrollee device should attempt to join; and
    a sendConnStatus attribute;
  attempting to join the Wi-Fi network; and
  transmitting a DPP Status Query Result frame to the configurator, the DPP Status Query Result frame including a DPP Connection Status object indicating a result of the attempt to join the Wi-Fi network.

Example 2: The method of example 1, wherein the indication of the band support of the enrollee device is a parameter in a DPP Configuration Request object, the method further comprising the enrollee device:
  including the DPP Configuration Request object in the DPP Configuration Request frame before the transmitting the DPP Configuration Request frame.

Example 3: The method of example 2, wherein the DPP Configuration Request object includes:
  a type of network the enrollee device wants to join; and
  a network role the enrollee device wants to obtain.

Example 4: The method of example 2 or example 3, wherein the parameter indicating the band support of the enrollee device indicates that the enrollee device supports:
  a 2.4 GHz band;
  a 5 GHz band;
  a 6 GHz band; or
  any combination thereof.

Example 5: The method of any one of examples 1 to 4, the method comprising the enrollee device:
  transmitting the DPP Configuration Request frame to the configurator on a DPP channel; and
  transmitting the DPP Status Query Result frame to the configurator on the DPP channel.

Example 6: The method of any one of examples 1 to 5, wherein the DPP Connection Status object includes: a connStatus, a result, a service Set Identifier (SSID), a channelList, a channel, a channel number, and an operating class.

Example 7: The method of example 6, wherein the result comprises:
the enrollee device successfully associated to an AP and has network access (STATUS_OK);
the enrollee device discovered the AP, and association or authentication failed (STATUS_AUTH_FAILURE);
an enrollee connection failed with an invalid connector during network introduction (STATUS_INVALID CONNECTOR);
the enrollee connection failed to connect to an AP that has an expired connector (STATUS_CONNECTOR_EXPIRED);
the enrollee connection failed to match an AP connector (STATUS_NO_MATCH); or
the enrollee device failed to discover an access point (STATUS_NO_AP).

Example 8: A method for provisioning an enrollee to a Wi-Fi network by a configurator device, the method comprising the configurator device:
receiving a Device Provisioning Protocol (DPP) Configuration Request frame from the enrollee, the DPP Configuration Request frame including an indication of band support of the enrollee;
based at least in part on the indication of the band support included in the received DPP Configuration Request frame, determining to include an indication of the Wi-Fi network to which the enrollee is directed to join and a sendConnStatus attribute in a DPP Configuration Response frame;
transmitting the DPP Configuration Response frame to the enrollee, the transmitting directing the enrollee to attempt to join the Wi-Fi network and the inclusion of the sendConnStatus attribute in the DPP Configuration Response frame directing the enrollee to transmit a DPP Status Query Result frame after attempting to join the Wi-Fi network; and
receiving a DPP Status Query Result frame from the enrollee, the DPP Status Query Result frame including a DPP Connection Status object indicating a result of the attempt by the enrollee to join the indicated Wi-Fi network.

Example 9: The method of example 8, wherein the indication of the band support of the enrollee is a parameter in a DPP Configuration Request object, and wherein the DPP Configuration Request frame includes the DPP Configuration Request object.

Example 10: The method of example 9, wherein the DPP Configuration Request object includes:
a type of network the enrollee wants to join; and
a network role the enrollee wants to obtain.

Example 11: The method of example 9 or example 10, wherein the parameter indicating the band support of the enrollee indicates that the enrollee supports:
a 2.4 GHz band;
a 5 GHz band;
a 6 GHz band; or
any combination thereof.

Example 12: The method of any one of examples 8 to 11, wherein the DPP Connection Status object includes: a connStatus, a result, a service Set Identifier (SSID), a channelList, a channel, a channel number, and an operating class.

Example 13: The method of example 12, wherein the result comprises:
the enrollee successfully associated to an AP and has network access (STATUS_OK);
the enrollee discovered the AP, and association or authentication failed (STATUS_AUTH_FAILURE);
an enrollee connection failed with an invalid connector during network introduction (STATUS_INVALID CONNECTOR);
the enrollee connection failed to connect to an AP that has an expired connector (STATUS_CONNECTOR_EXPIRED);
the enrollee connection failed to match an AP connector (STATUS_NO_MATCH); or
the enrollee failed to discover an access point (STATUS_NO_AP).

Example 14: The method of any one of examples 8 to 13, further comprising the configurator device:
listening on a DPP Wi-Fi channel to receive the DPP Status Query Result frame; and
either:
receiving the DPP Status Query Result frame; or
terminating the listening after a timeout period of time.

Example 15: A Wi-Fi device implemented as an enrollee device, the Wi-Fi device comprising:
a Wi-Fi transceiver;
a memory and processor system to implement a provisioning manager application that executable by the processor to configure the Wi-Fi device to perform any one of examples 1 to 14.

CONCLUSION

Although aspects of a device provisioning protocol with enrollee feedback have been described in language specific to features and/or methods, the subject of the appended claims is not necessarily limited to the specific features or methods described. Rather, the specific features and methods are disclosed as example implementations of the device provisioning protocol with enrollee feedback, and other equivalent features and methods are intended to be within the scope of the appended claims. Further, various different aspects are described, and it is to be appreciated that each described aspect can be implemented independently or in connection with one or more other described aspects.

What is claimed is:
1. A method for provisioning an enrollee device to a Wi-Fi network by a configurator, the method comprising the enrollee device:
transmitting a Device Provisioning Protocol (DPP) Configuration Request frame to the configurator, the DPP Configuration Request frame including an indication of band support of the enrollee device;
receiving a DPP Configuration Response frame including:
an indication of a Wi-Fi network that the enrollee device should attempt to join; and
a sendConnStatus attribute that directs the enrollee device to report a status of the attempt to join the Wi-Fi network to the configurator;
attempting to join the Wi-Fi network; and
transmitting a DPP Status Query Result frame to the configurator, the DPP Status Query Result frame including a DPP Connection Status object indicating a result of the attempt to join the Wi-Fi network.

2. The method of claim 1, wherein the indication of the band support of the enrollee device is a parameter in a DPP Configuration Request object, the method further comprising the enrollee device:
including the DPP Configuration Request object in the DPP Configuration Request frame before the transmitting the DPP Configuration Request frame.

3. The method of claim 2, wherein the DPP Configuration Request object includes:
a type of network the enrollee device wants to join; and
a network role the enrollee device wants to obtain.

4. The method of claim 2, wherein the parameter indicating the band support of the enrollee device indicates that the enrollee device supports:
a 2.4 GHz band;
a 5 GHz band;
a 6 GHz band; or
any combination thereof.

5. The method of claim 1, the method comprising the enrollee device:
transmitting the DPP Configuration Request frame to the configurator on a DPP channel; and
transmitting the DPP Status Query Result frame to the configurator on the DPP channel.

6. The method of claim 1, wherein the DPP Connection Status object includes: a connStatus, a result, a service Set Identifier (SSID), a channelList, a channel, a channel number, and an operating class.

7. The method of claim 6, wherein the result comprises:
the enrollee device successfully associated to an AP and has network access (STATUS_OK);
the enrollee device discovered the AP, and association or authentication failed (STATUS_AUTH_FAILURE);
an enrollee connection failed with an invalid connector during network introduction (STATUS_INVALID_CONNECTOR);
the enrollee connection failed to connect to an AP that has an expired connector (STATUS_CONNECTOR_EXPIRED);
the enrollee connection failed to match an AP connector (STATUS_NO_MATCH); or
the enrollee device failed to discover an access point (STATUS_NO_AP).

8. A method for provisioning an enrollee to a Wi-Fi network by a configurator device, the method comprising the configurator device:
receiving a Device Provisioning Protocol (DPP) Configuration Request frame from the enrollee, the DPP Configuration Request frame including an indication of band support of the enrollee;
based at least in part on the indication of the band support included in the received DPP Configuration Request frame, determining to include an indication of the Wi-Fi network to which the enrollee is directed to join and a sendConnStatus attribute, that directs the enrollee device to report a status of the attempt to join the Wi-Fi network to the configurator, in a DPP Configuration Response frame;
transmitting the DPP Configuration Response frame to the enrollee, the transmitting directing the enrollee to attempt to join the Wi-Fi network and the inclusion of the sendConnStatus attribute in the DPP Configuration Response frame directing the enrollee to transmit a DPP Status Query Result frame after attempting to join the Wi-Fi network; and
receiving a DPP Status Query Result frame from the enrollee, the DPP Status Query Result frame including a DPP Connection Status object indicating a result of the attempt by the enrollee to join the indicated Wi-Fi network.

9. The method of claim 8, wherein the indication of the band support of the enrollee is a parameter in a DPP Configuration Request object, and wherein the DPP Configuration Request frame includes the DPP Configuration Request object.

10. The method of claim 9, wherein the DPP Configuration Request object includes:
a type of network the enrollee wants to join; and
a network role the enrollee wants to obtain.

11. The method of claim 9, wherein the parameter indicating the band support of the enrollee indicates that the enrollee supports:
a 2.4 GHz band;
a 5 GHz band;
a 6 GHz band; or
any combination thereof.

12. The method of claim 8, wherein the DPP Connection Status object includes: a connStatus, a result, a service Set Identifier (SSID), a channelList, a channel, a channel number, and an operating class.

13. The method of claim 12, wherein the result comprises:
the enrollee successfully associated to an AP and has network access (STATUS_OK);
the enrollee discovered the AP, and association or authentication failed (STATUS_AUTH_FAILURE);
an enrollee connection failed with an invalid connector during network introduction (STATUS_INVALID_CONNECTOR);
the enrollee connection failed to connect to an AP that has an expired connector (STATUS_CONNECTOR_EXPIRED);
the enrollee connection failed to match an AP connector (STATUS_NO_MATCH); or
the enrollee failed to discover an access point (STATUS_NO_AP).

14. The method of claim 8, further comprising the configurator device:
listening on a DPP Wi-Fi channel to receive the DPP Status Query Result frame; and
either:
receiving the DPP Status Query Result frame; or
terminating the listening after a timeout period of time.

15. A Wi-Fi device implemented as an enrollee device, the Wi-Fi device comprising:
a Wi-Fi transceiver;
a memory and processor system to implement a provisioning manager application that executable by the processor to configure the Wi-Fi device to:
transmit a Device Provisioning Protocol (DPP) Configuration Request frame to the configurator, the DPP Configuration Request frame including an indication of band support of the enrollee device;
receive a DPP Configuration Response frame including:
an indication of a Wi-Fi network that the enrollee device should attempt to join; and
a sendConnStatus attribute that directs the enrollee device to report a status of the attempt to join the Wi-Fi network to the configurator;
attempt to join the Wi-Fi network; and
transmit a DPP Status Query Result frame to the configurator, the DPP Status Query Result frame including a DPP Connection Status object indicating a result of the attempt to join the Wi-Fi network.

16. The Wi-Fi device of claim 15, wherein the indication of the band support of the enrollee device is a parameter in a DPP Configuration Request object, the provisioning manager application further executable by the processor to configure the Wi-Fi device to:
   include the DPP Configuration Request object in the DPP Configuration Request frame before the transmission of the DPP Configuration Request frame.

17. The Wi-Fi device of claim 16, wherein the DPP Configuration Request object includes:
   a type of network the enrollee device wants to join; and
   a network role the enrollee device wants to obtain.

18. The Wi-Fi device of claim 16, wherein the parameter indicating the band support of the enrollee device indicates that the enrollee device supports:
   a 2.4 GHz band;
   a 5 GHz band;
   a 6 GHz band; or
   any combination thereof.

19. The Wi-Fi device of claim 15, the provisioning manager application further executable by the processor to configure the Wi-Fi device to:
   transmit the DPP Configuration Request frame to the configurator on a DPP channel; and
   transmit the DPP Status Query Result frame to the configurator on the DPP channel.

20. The Wi-Fi device of claim 15, wherein the DPP Connection Status object includes: a connStatus, a result, a service Set Identifier (SSID), a channelList, a channel, a channel number, and an operating class.

* * * * *